United States Patent
Onishi

(10) Patent No.: US 10,976,902 B2
(45) Date of Patent: Apr. 13, 2021

(54) USING REFERENCE POINT TO PERFORM ENLARGEMENT AND REDUCTION OF DISPLAYED CONTENT

(71) Applicant: KYOCERA Document Solutions Inc., Osaka (JP)

(72) Inventor: Seiji Onishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 31 days.

(21) Appl. No.: 16/483,179

(22) PCT Filed: Dec. 14, 2017

(86) PCT No.: PCT/JP2017/044917
§ 371 (c)(1),
(2) Date: Aug. 2, 2019

(87) PCT Pub. No.: WO2018/142783
PCT Pub. Date: Aug. 9, 2018

(65) Prior Publication Data
US 2020/0233549 A1 Jul. 23, 2020

(30) Foreign Application Priority Data
Feb. 6, 2017 (JP) .............. JP2017-019424

(51) Int. Cl.
*G06F 3/0484* (2013.01)
*G06F 3/0488* (2013.01)

(52) U.S. Cl.
CPC .......... *G06F 3/0484* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 2008/0148177 A1* | 6/2008 | Lang | G06F 3/0481 715/784 |
| 2013/0104076 A1* | 4/2013 | Cristescu | G06F 3/0485 715/800 |

(Continued)

FOREIGN PATENT DOCUMENTS

JP 2015-049621 A 3/2015

*Primary Examiner* — Mandrita Brahmachari
(74) *Attorney, Agent, or Firm* — Studebaker & Brackett PC

(57) ABSTRACT

A display device (10) includes a display section (20), a detector (30), and a controller (50). The display section (20) has a display surface (22). The display section (20) is configured to display an image (G). The detector (30) is capable of detecting a plurality of contact positions based on contact made on the display surface (22) by a detected object. The plurality of contact positions include a first contact position (P1), a second contact portion (P2), and a third contact position (P3). When the detector (30) detects the first contact position (P1) and subsequently detects the second contact position (P2) and the third contact position (P3), the controller (50) moves the image (G) so that the first contact position (P1) is positioned at a prescribed reference point (BP). When determining that a pinching operation has been performed based on a change in the distance between the second contact position (P2) and the third contact position (P3), the controller (50) performs an enlargement process or a reduction process on the image (G) with respect to the prescribed reference point (BP).

13 Claims, 10 Drawing Sheets

(56) References Cited

U.S. PATENT DOCUMENTS

| | | | |
|---|---|---|---|
| 2014/0071171 A1* | 3/2014 | McGowan | G06F 3/04883 345/661 |
| 2014/0375583 A1* | 12/2014 | Kim | G06F 3/04883 345/173 |
| 2016/0127636 A1* | 5/2016 | Ito | H04N 5/232122 348/333.12 |
| 2017/0177204 A1* | 6/2017 | Kangas | G06F 3/04845 |
| 2017/0220241 A1* | 8/2017 | Vangapalli | G06F 3/0482 |
| 2018/0052518 A1* | 2/2018 | Zhu | G06F 3/016 |

* cited by examiner

USING REFERENCE POINT TO PERFORM ENLARGEMENT AND REDUCTION OF DISPLAYED CONTENT

TECHNICAL FIELD

The present invention is related to a display device.

BACKGROUND ART

Conventionally, a display device that enlarges or reduces a displayed image as a result of a pinching operation performed by a user is known (for example, Patent Literature 1). A mobile terminal described in Patent Literature 1 enlarges an image as a result of a pinch-out operation performed by a user. Further, the mobile terminal described in Patent Literature 1 reduces an image as a result of a pinch-in operation performed by a user.

CITATION LIST

Patent Literature

[Patent Literature 1]
Japanese Patent Application Laid-Open Publication No. 2015-49621

SUMMARY OF INVENTION

Technical Problem

However, on the mobile terminal described in Patent Literature 1, there is a possibility that a finger of the user performing the pinching operation may overlap with the image the user wishes to enlarge or reduce, which degrades the operability of the mobile terminal.

The present invention was conceived of in view of the problem described above. It is an object of the present invention to provide a display device of which it is possible to improve the operability.

Solution to Problem

A display device according to the present invention includes a display section, a detector, and a controller. The display section has a display surface. The display section displays an image. The detector is capable of detecting a plurality of contact positions based on contact made on the display surface by a detected object. The controller controls the display section and the detector. The plurality of contact positions includes a first contact position, a second contact position, and a third contact position. When the detector detects the first contact position and subsequently detects the second contact position and the third contact position, the controller moves the image so that the first contact position is positioned at a prescribed reference point. When the controller determines that a pinching operation has been performed based on a change in a distance between the second contact position and the third contact position, the controller performs an enlargement process or a reduction process on the image with respect to the prescribed reference point.

Advantageous Effects of Invention

According to the present invention, it is possible to improve the operability.

DESCRIPTION OF EMBODIMENTS

Figure 1:
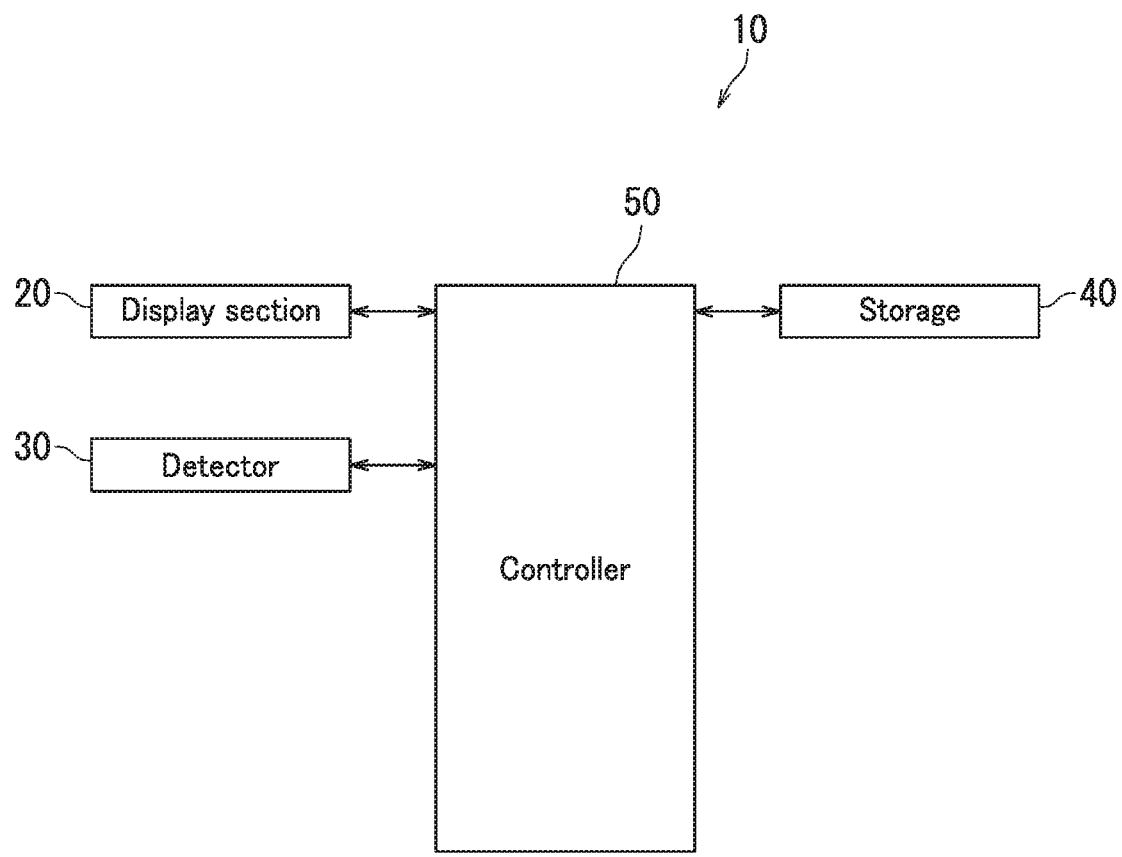
FIG. 1 is a block diagram illustrating a display device according to an embodiment of the present invention.

The following describes an embodiment of the present invention with reference to the drawings. Elements in the drawings that are the same or equivalent are labeled with the same reference numerals and description thereof will not be repeated.

Figure 2A:
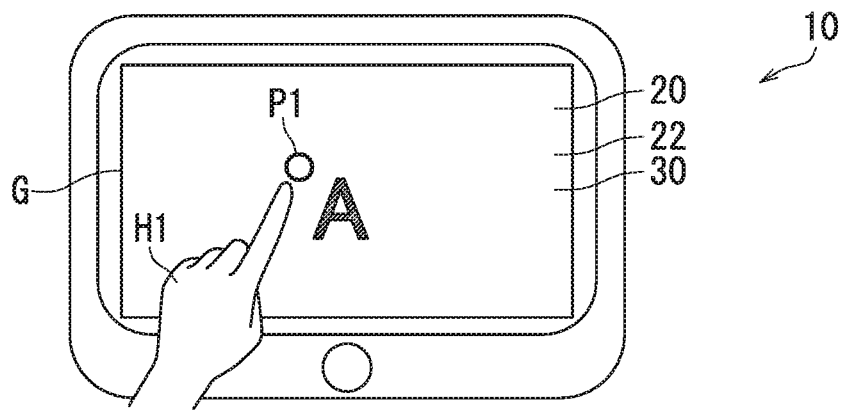
FIG. 2A is a schematic view of the display device according to the embodiment of the present invention.
Figure 2B:
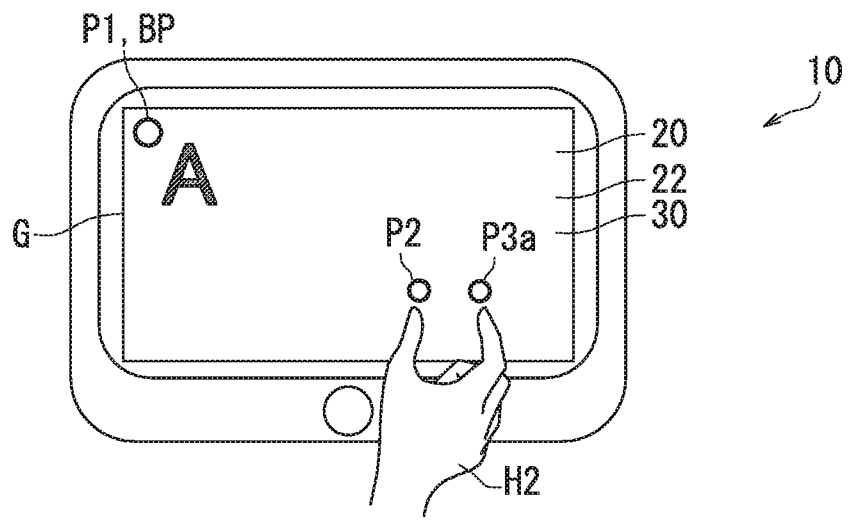
FIG. 2B is a schematic view of the display device according to the embodiment of the present invention.
Figure 2C:
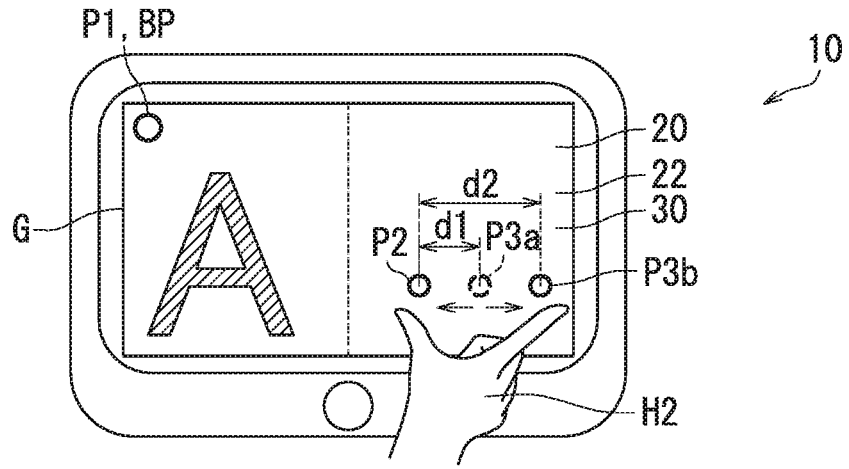
FIG. 2C is a schematic view of the display device according to the embodiment of the present invention.

A display device 10 according to an embodiment of the present invention will be described with reference to FIGS. 1 and 2A to 2C. FIG. 1 is a block diagram illustrating the display device 10 according to the embodiment of the present invention. FIGS. 2A to 2C are schematic views of the display device 10 according to the embodiment of the present invention. In FIG. 2A, a left hand H1 denotes the left hand of a user operating the display device 10. In FIGS. 2B and 2C, a right hand H2 denotes the right hand of the user operating the display device 10. A first contact position P1, a second contact position P2, a third contact position P3a, and a third contact position P3b denote contact positions detected by a detector 30. A distance d1 denotes the distance between the second contact position P2 and the third contact position P3a. A distance d2 denotes the distance between the second contact position P2 and the third contact position P3b. In the present specification, the first contact position P1, the second contact position P2, the third contact position P3a, and the third contact position P3b may collectively be referred to as contact positions P.

As illustrated in FIG. 1, the display device 10 includes a display section 20, a detector 30, storage 40, and a controller 50. The display device 10 is, for example, a smartphone or a tablet computer.

As illustrated in FIGS. 2A to 2C, the display section 20 includes a display surface 22. The display section 20 displays an image G. In the present embodiment, the image G contains an image representing the letter "A". The display section 20 is a liquid crystal panel, for example.

The detector 30 detects contact positions P based on contact made on the display surface 22 by a detected object. The detector 30 is capable of detecting the plurality of contact positions P. The plurality of contact positions P include the first contact position P1, the second contact position P2, and the third contact positions P3. For example, the detector 30 is a touch sensor. The detected object is, for example, one or more fingers of the user or a touch pen used for operating the display device 10. In the present specification, an example will be described in which the detected object is one or more fingers of the user operating the display device 10.

The storage 40 is read-only memory (ROM) and random-access memory (RAM), for example. The ROM has a control program stored therein.

The controller 50 controls the display section 20, the detector 30, and the storage 40. The controller 50 is a central processing unit (CPU), for example. As illustrated in FIG. 2B, when the detector 30 detects the first contact position P1 and subsequently detects the second contact position P2 and a third contact position P3, the controller 50 moves the image G so that the first contact position P1 is positioned at a prescribed reference point BP. Further, as illustrated in FIG. 2C, when determining that a pinching operation has been performed based on a change in the distance between the second contact position P2 and the third contact position P3, the controller 50 performs an enlargement process or a reduction process on the image G with respect to the prescribed reference point BP. In this manner, when the user has performed the pinching operation, the controller 50 moves the image G and subsequently performs the enlargement process or the reduction process on the image G. Accordingly, it is possible to prevent the situation where the fingers of the user performing the pinching operation overlap with the image the user wishes to enlarge the image representing the letter "A"). As a result, it is possible to improve the operability.

Figure 3:
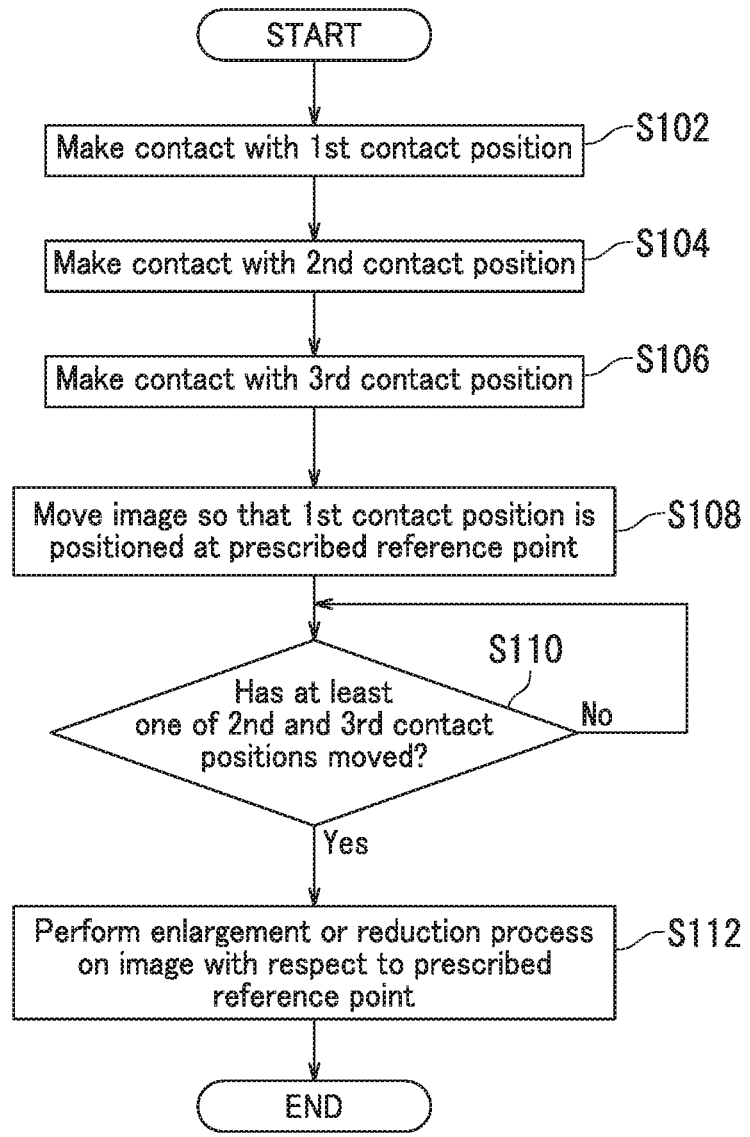
FIG. 3 is a flowchart depicting a method for setting an enlargement process or a reduction process implemented by the display device on an image according to the embodiment of the present invention.

A method for performing the enlargement process or the reduction process implemented by the display device 10 on the image G according to the embodiment of the present invention will be described with reference to FIGS. 1 to 3. FIG. 3 is a flowchart depicting the method for setting the enlargement process or the reduction process implemented by the display device 10 on the image G according to the embodiment of the present invention. As a result of the processes at Steps S102 through S112 depicted in FIG. 3, the enlargement process or the reduction process is performed on the image G. In the present embodiment, the enlargement process performed on the image G will be described.

Step S102: The user makes contact with the first contact position P1. More specifically, as illustrated in FIG. 2A, the index finger of the left hand H1 of the user touches the first contact position P1. As a result of the first contact position P1 being touched, the detector 30 detects the first contact position P1. The process proceeds to Step S104.

Step S104: The user makes contact with the second contact position P2. More specifically, as illustrated in FIG. 2B, the thumb of the right hand H2 of the user touches the second contact position P2. As a result of the second contact position P2 being touched, the detector 30 detects the second contact position P2. The process proceeds to Step S106.

Step S106: The user makes contact with the third contact position P3a. More specifically, as illustrated in FIG. 2B, the index finger of the right hand H2 of the user touches the third contact position P3a, As a result of the third contact position P3a being touched, the detector 30 detects the third contact position P3a. The process proceeds to Step S108.

Step S108: The controller 50 moves the image G so that the first contact position P1 is positioned at the prescribed reference point BP. More specifically, as illustrated in FIG. 2B, when the detector 30 detects the first contact position P1 and subsequently detects the second contact position P2 and the third contact position P3a, the controller 50 moves the image G so that the first contact position P1 is positioned at the prescribed reference point BP. In the present embodiment, the prescribed reference point BP is positioned on the upper left side of the display surface 22. Accordingly, the image G moves to the upper left side. In other words, the image representing the letter "A" moves to the upper left side. The process proceeds to Step S110.

Step S110: The controller 50 determines whether or not at least one of the second contact position P2 and the third contact position P3a has moved. More specifically, the controller 50 determines whether or not at least one of the thumb of the right hand H2 of the user and the index finger of the right hand H2 of the user has moved. Even more specifically, the controller 50 determines whether or not the distance between the second contact position P2 and the third contact position P3a has changed. When the controller 50 determines that neither the second contact position P2 nor the third contact position P3a has moved (Step S110: No), i.e., when the controller 50 determines that the user has not performed a pinching operation, the process returns to Step S110. When the controller 50 determines that at least one of the second contact position P2 and the third contact position P3a has moved (Step S110: Yes), i.e., when the controller 50 determines that the user has performed a pinching operation, the process proceeds to Step S112. For example, as illustrated in FIG. 2C, when the index finger of the right hand H2 of the user has moved from the third contact position P3a to the third contact position P3b, the distance between the second contact position P2 and the third contact position P3b changes from the distance d1 to the distance d2. Accordingly, the controller 50 determines that the user has performed the pinching operation (Step S110: Yes), and the process proceeds to Step S112.

Step S112: The controller 50 performs the enlargement or the reduction process on the image G with respect to the prescribed reference point BP. More specifically, the controller 50 performs the enlargement process or the reduction process on the image G while using the reference point BP as a starting point. In the present embodiment, as illustrated in FIG. 2C, the controller 50 performs the enlargement process on the image G while using the reference point BP as the starting point. The process thus ends.

As described above with reference to FIGS. 1 to 3, when the detector 30 detects the first contact position P1 and subsequently detects the second contact position P2 and the third contact position P3a, the controller 50 moves the image G so that the first contact position P1 is positioned at the prescribed reference point BP. When determining that a pinching operation has been performed based on the change in the distance between the second contact position P2 and the third contact position P3a, the controller 50 performs the enlargement process or the reduction process on the image G with respect to the prescribed reference point BP. Accordingly, it is possible to prevent the situation where the fingers of the user performing the pinching operation overlap with the image the user wishes to enlarge (e.g., the image representing the letter "A"). As a result, it is possible to improve the operability.

Further, when the detector 30 detects the first contact position P1 and subsequently detects the second contact position P2 and the third contact position P3, the controller 50 moves the image G so that the first contact position P1 is positioned at the prescribed reference point BP. Accordingly, before the pinching operation is performed, the image G is moved so as to be positioned at the prescribed reference point BP. Accordingly, it is possible to prevent the situation where the fingers of the user performing the pinching operation overlap with the image the user wishes to enlarge (e.g., the image representing the letter "A"). As a result, it is possible to improve the operability.

In this situation, before performing the pinching operation, the user may take a finger out of contact with the first contact position P1. Alternatively, the user may perform the pinching operation while pressing the first contact position P1.

In the display device 10 described with reference to FIGS. 1 to 3, the prescribed reference point BP is positioned on the upper left side of the display surface 22; however, the prescribed reference point BP may be positioned at the center of the display surface 22.

Figure 4A:
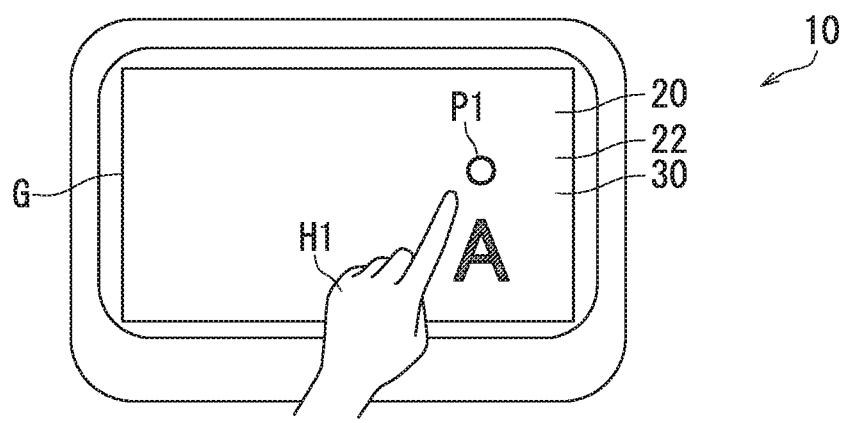
FIG. 4A is a schematic view of the display device according to the embodiment of the present invention.
Figure 4B:
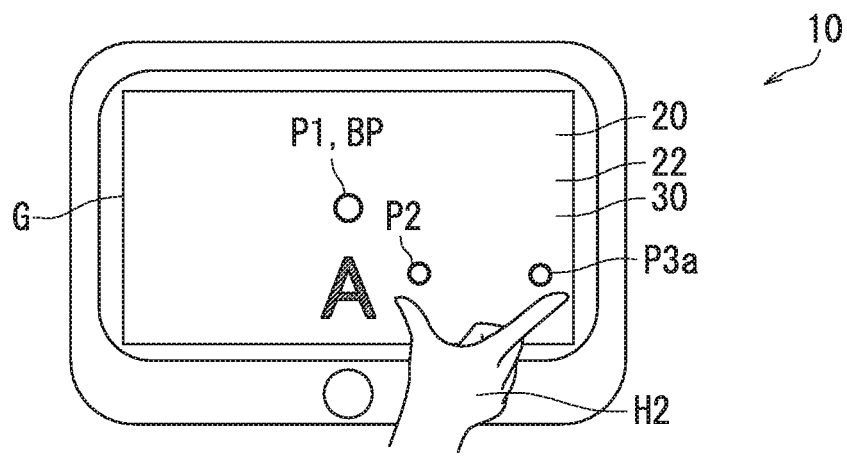
FIG. 4B is a schematic view of the display device according to the embodiment of the present invention.
Figure 4C:
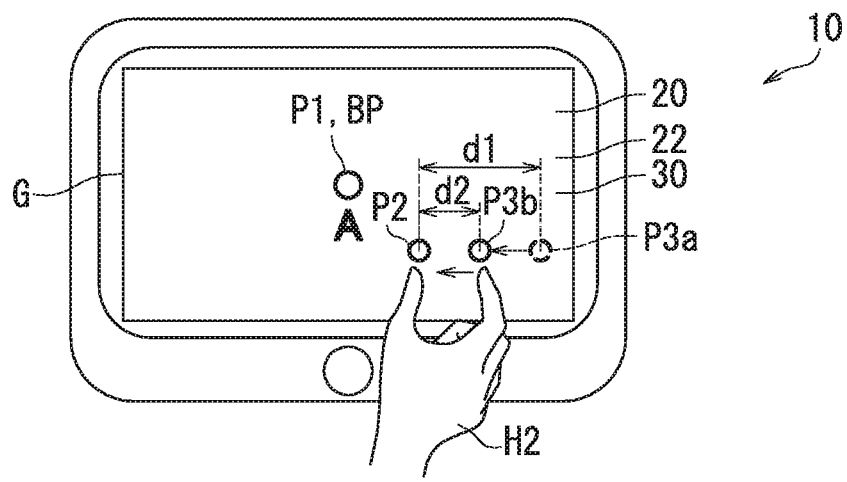
FIG. 4C is a schematic view of the display device according to the embodiment of the present invention.

Another method for performing an enlargement process or a reduction process implemented by the display device 10 on the image G according to the embodiment of the present invention will be described with reference to FIGS. 1 and 4A to 4C. FIGS. 4A to 4C are schematic views of the display device 10 according to the embodiment of the present invention.

As illustrated in FIG. 4A, as a result of the first contact position P1 being touched, the detector 30 detects the first contact position P1.

As illustrated in FIG. 4B, as a result of the second contact position P2 being touched, the detector 30 detects the second contact position P2. Further, as a result of the third contact position P3a being touched, the detector 30 detects the third contact position P3a. When the detector 30 detects the second contact position P2 and the third contact position P3a, the controller 50 moves the image G so that the first contact position P1 is in a prescribed reference point BP. In the present embodiment, the prescribed reference point BP is positioned at the center of the display surface 22. Accordingly, the image representing the letter "A" moves to the center.

As illustrated in FIG. 4C, when the index finger of the right hand H2 of the user has moved from the third contact position P3a to the third contact position P3b, the distance between the second contact position P2 and the third contact position P3b changes from the distance d1 to the distance d2. As a result, the controller 50 determines that the user has performed a pinching operation. Further, the controller 50 performs the enlargement process or the reduction process on the image G with respect to the prescribed reference point BP. More specifically, the controller 50 performs the enlargement process or the reduction process on the image G while using the reference point BP as a starting point. In the present embodiment, as illustrated in FIG. 4C, the controller 50 performs the reduction process on the image G while using the reference point BP as the starting point.

As described above with reference to FIGS. 1 and 4A to 4C, the prescribed reference point BP is positioned at the center of display surface 22. Accordingly, when the pinching operation is to be performed, the image the user wishes to enlarge or reduce e.g., the image representing the letter "A") is displayed at the center. As a result, the image the user wishes to enlarge or reduce in the first contact position P1 moves to a position that is easier to see. As a result, it is possible to improve the operability.

The display device 10 may be configured to switch the position of the reference point BP based on a positional relationship between the first contact position P1 and an operation position MP. The operation position MP is defined by the second contact position P2 and the third contact position P3a.

Figure 5:
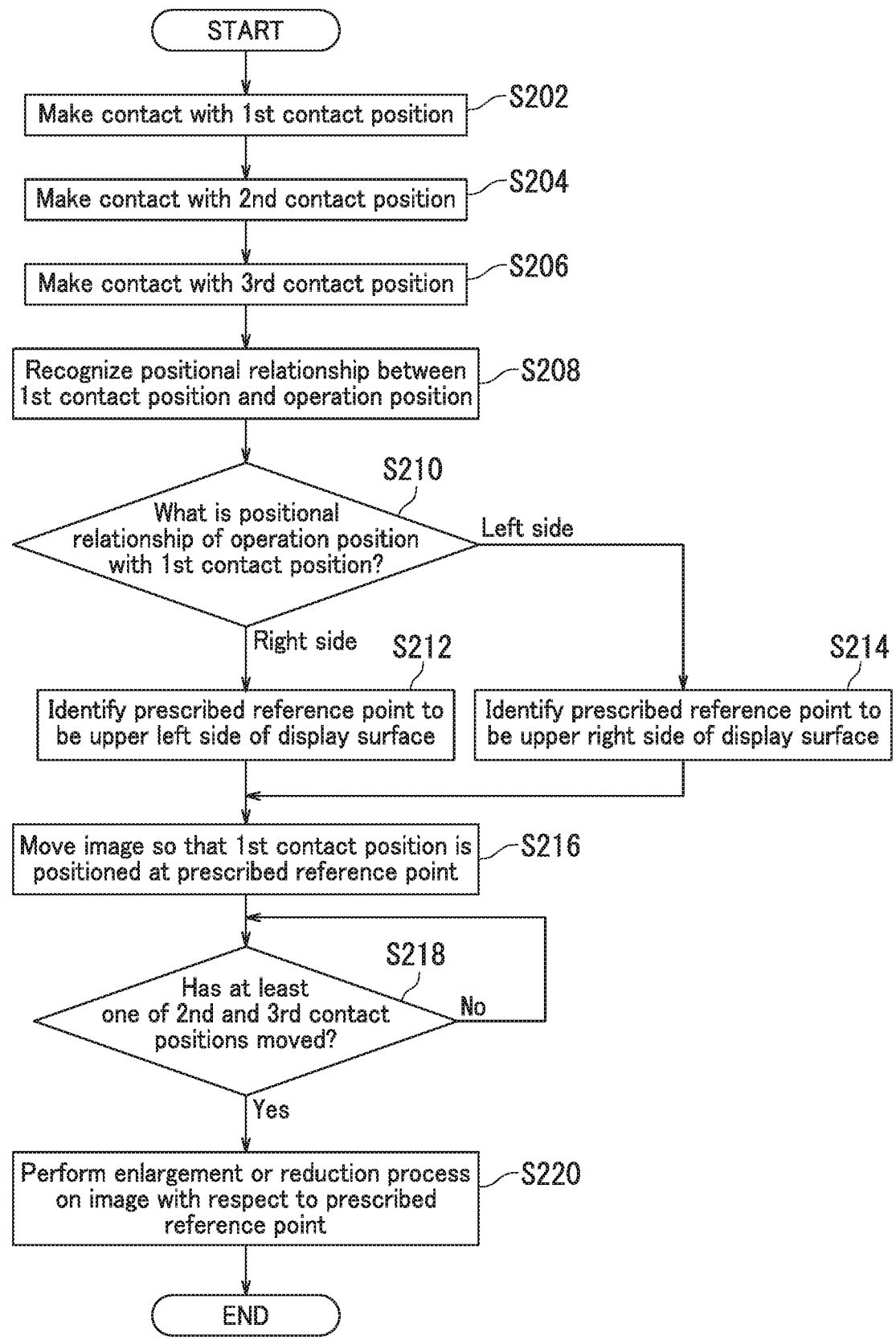
FIG. 5 is a flowchart depicting a method for setting an enlargement process or a reduction process implemented by the display device on an image according to the embodiment of the present invention.

Another method for performing an enlargement process or a reduction process implemented by the display device 10 on the image G according to the embodiment of the present invention will be described with reference to FIGS. 1 and 5 to 7C. FIG. 5 is a flowchart depicting the method for setting the enlargement process or the reduction process implemented by the display device 10 on the image G according to the embodiment of the present invention. FIGS. 6A to 6C and 7A to 7C are schematic views of the display device 10 according to the embodiment of the present invention.

In FIGS. 6A to 6C and 7A to 7C, edge parts Ea, Eb, Ec, and Ed respectively denote an edge part on the upper side of the display surface 22, an edge part on the right-hand side of the display surface 22, an edge part on the lower side of the display surface 22, and an edge part on the left-hand side of the display surface 22. In FIGS. 6A to 6C and 7A to 7C, corner parts Ca, Cb, Cc, and Cd respectively denote a corner part on the upper left side of the display surface 22, a corner part on the upper right side of the display surface 22, a corner part on the lower right side of the display surface 22, and a corner part on the lower left side of the display surface 22. In FIGS. 6A to 6C and 7A to 7C, a boundary line BL denotes a boundary line extending through the first contact position P1. A first region R1 and a second region R2 are the regions divided by the boundary line BL. In FIGS. 6A to 6C and 7A to 7C, the first region R1 is positioned on the left-hand side of the first contact position P1, whereas the second region R2 is positioned on the right-hand side of the first contact position P1.

As a result of the processes performed at Steps S202 through S220 depicted in FIG. 5, the enlargement process or the reduction process is performed on the image G. In the present embodiment, the enlargement process performed on the image G will be described. Description of some of the processes that are duplicate of those in the method for performing the enlargement process or the reduction process on the image G depicted in the flowchart in FIG. 3 will be omitted.

Figure 6A:
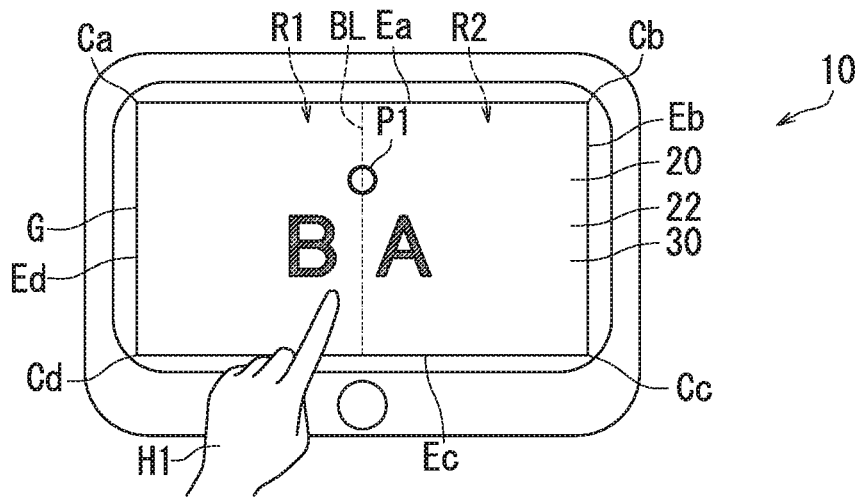
FIG. 6A is a schematic view of the display device according to the embodiment of the present invention.
Figure 7A:
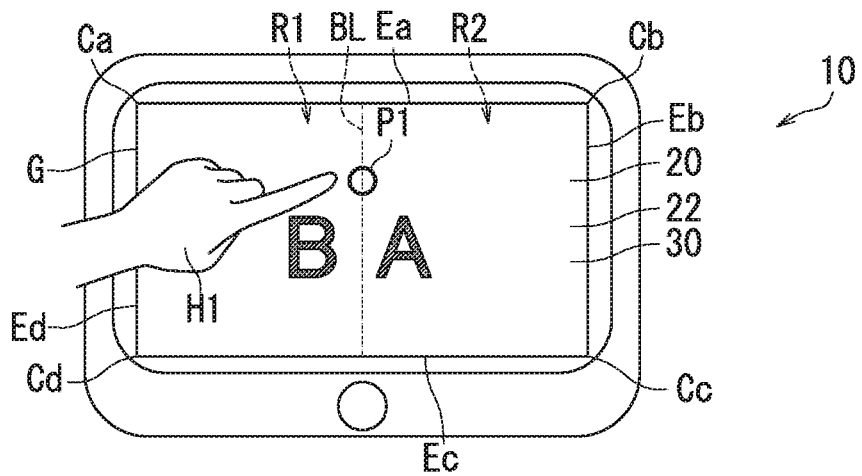
FIG. 7A is a schematic view of the display device according to the embodiment of the present invention.

Step S202: The user makes contact with the first contact position P1. More specifically, as illustrated in FIGS. 6A and 7A, the index finger of the left hand H1 of the user touches the first contact position P1. As a result of the first contact position P1 being touched, the detector 30 detects the first contact position P1. When the detector 30 has detected the first contact position P1, the controller 50 identifies the boundary line BL so as to extend through the first contact position P1. Further, the controller 50 identifies the region divided into two by the boundary line BL as the first region R1 and the second region R2. The process proceeds to Step S204.

Figure 6B:
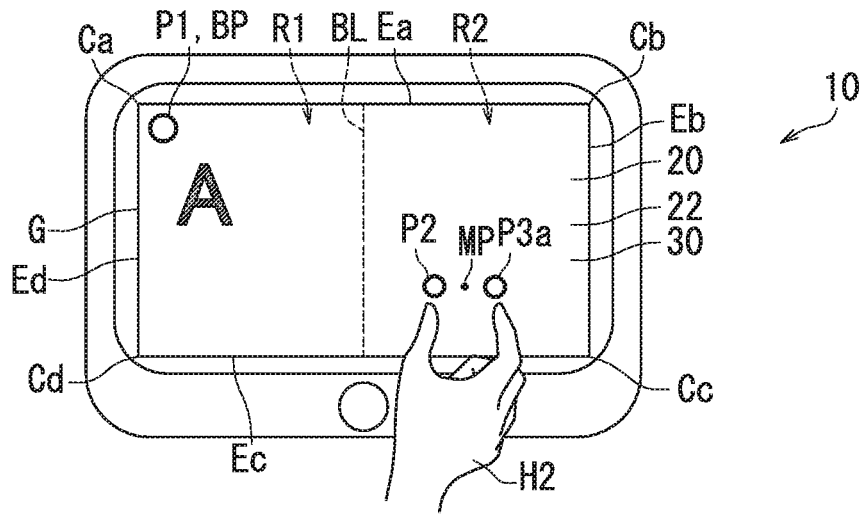
FIG. 6B is a schematic view of the display device according to the embodiment of the present invention.
Figure 7B:
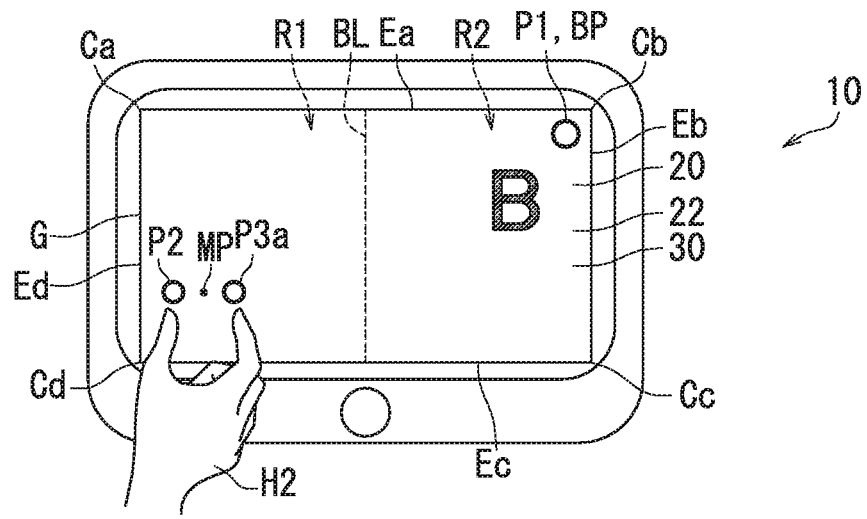
FIG. 7B is a schematic view of the display device according to the embodiment of the present invention.

Step S204: The user makes contact with the second contact position P2. More specifically, as illustrated in FIGS. 6B and 7B, the thumb of the right hand H2 of the user touches the second contact position P2. As a result of the second contact position P2 being touched, the detector 30 detects the second contact position P2. The process proceeds to Step S206.

Step S206: The user makes contact with the third contact position P3a. More specifically, as illustrated in FIGS. 6B and 7B, the index finger of the right hand H2 of the user touches the third contact position P3a. As a result of the third contact position P3a being touched, the detector 30 detects the third contact position P3a. The process proceeds to Step S208.

Step S208: The controller 50 recognizes the positional relationship between the first contact position P1 and the operation position MP. As illustrated in FIGS. 6B and 7B, the operation position MP is defined by the second contact position P2 and the third contact position P3a. In the present embodiment, the operation position MP is the middle point between the second contact position P2 and the third contact position P3a. Alternatively, the operation position MP may be one of the second contact position P2 and the third contact position P3a. The process proceeds to Step S210.

Step S210: The controller 50 determines the positional relationship of the operation position MP with respect to the first contact position P1. When the controller 50 determines that the operation position MP is positioned on the left-hand side of the first contact position P1 (Step S210: Left side), the process proceeds to Step S214. When the controller 50 determines that the operation position MP is positioned on the right-hand side of the first contact position P1 (Step S210: Right side), the process proceeds to Step S212. For example, when the operation position MP is positioned on the left-hand side of the first contact position P1 as illustrated in FIG. 7B, the controller 50 determines that the operation position MP is positioned on the left-hand side of the first contact position P1, and the process proceeds to Step S214. By contrast, when the operation position MP is positioned on the right-hand side of the first contact position P1 as illustrated in FIG. 6B, the controller 50 determines that the operation position MP is positioned on the right-hand side of the first contact position P1, and the process proceeds to Step S212.

Step S212: The controller 50 identifies the prescribed reference point BP to be on the upper left side of the display surface 22. In other words, as illustrated in FIG. 6B, the controller 50 identifies the prescribed reference point BP to be positioned in the first region R1 that is different from the second region R2 in which the operation position MP is positioned. In the present embodiment, the prescribed reference point BP is positioned in the edge part Ea. More specifically, the prescribed reference point BP is positioned in the corner part Ca. The process proceeds to Step S216.

Step S214: The controller 50 identifies the prescribed reference point BP to be on the upper right side of the display surface 22. In other words, as illustrated in FIG. 7B, the controller 50 identifies the prescribed reference point BP to be in the second region R2 that is different from the first region R1 in which the operation position MP is positioned. In the present embodiment, the prescribed reference point BP is positioned in the edge part Ea. More specifically, the prescribed reference point BP is positioned in the corner part Cb. The process proceeds to Step S216.

Step S216: The controller 50 moves the image G so that the first contact position P1 is positioned at the prescribed reference point BP. More specifically, in a case where the controller 50 determines that the operation position MP is positioned on the right-hand side of the first contact position P1 at Step S210 (Step S210: Right side), when the detector 30 detects the first contact position P1 and subsequently detects the second contact position P2 and the third contact position P3a as illustrated in FIG. 6B, the controller 50 moves the image G so that the first contact position P1 is positioned at the prescribed reference point BP identified by the controller 50, i.e., so as to be positioned on the upper left side of the display surface 22. Accordingly, the image G moves to the upper left side of the display surface 22. In other words, the image representing the letter "A" moves to the upper left side of the display surface 22. By contrast, in a case where the controller 50 determines that the operation position MP is positioned on the left-hand side of the first contact position P1 at Step S210 (Step S210: Left side), when the detector 30 detects the first contact position P1 and subsequently detects the second contact position P2 and the third contact position P3a as illustrated in FIG. 7B, the controller 50 moves the image G so that the first contact position P1 is positioned at the prescribed reference point BP identified by the controller 50, i.e., so as to be positioned on the upper right side of the display surface 22. In other words, the controller 50 moves the image G so that the first contact position P1 is positioned on the upper right side of the display surface 22. Accordingly, the image G moves to the upper right side of the display surface 22. In other words, the image representing the letter "B" moves to the upper right side of the display surface 22. The process proceeds to Step S218.

Figure 6C:
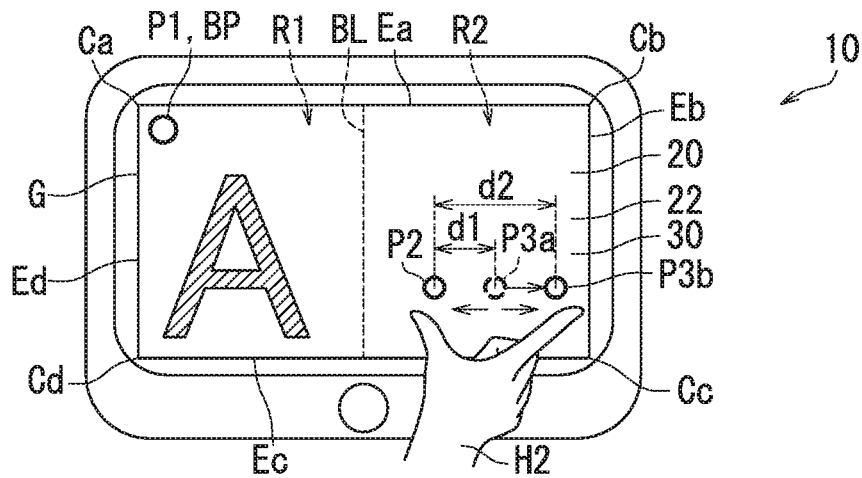
FIG. 6C is a schematic view of the display device according to the embodiment of the present invention.
Figure 7C:
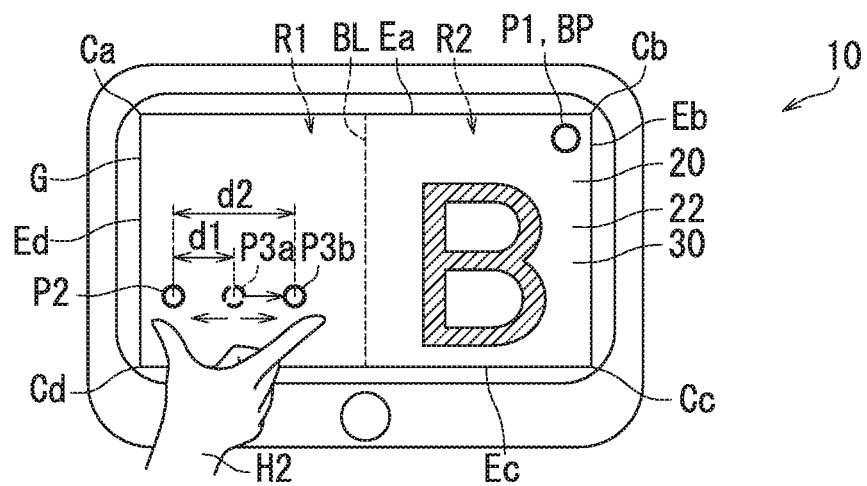
FIG. 7C is a schematic view of the display device according to the embodiment of the present invention.

Step S218: The controller 50 determines whether or not at least one of the second contact position P2 and the third contact position P3a has moved. More specifically, the controller 50 determines whether or not at least one of the thumb of the right hand H2 of the user and the index finger of the right hand H2 of the user has moved. Even more specifically, the controller 50 determines whether or not the distance between the second contact position P2 and the third contact position P3a has changed. When the controller 50 determines that neither the second contact position P2 nor the third contact position P3a has moved (Step S218: No), i.e., when the controller 50 determines that the user has not performed a pinching operation, the process returns to Step S218. When the controller 50 determines that at least one of the second contact position P2 and the third contact position P3a has moved (Step S218: Yes), i.e., when the controller 50 determines that the user has performed a pinching operation, the process proceeds to Step S220. For example, as illustrated in FIGS. 6C and 7C, when the index finger of the right hand H2 of the user has moved from the third contact position P3a to the third contact position P3b, the distance between the second contact position P2 and the third contact position P3b has changed from the distance d1 to the distance d2. Accordingly, the controller 50 determines that the user has performed the pinching operation (Step S218: Yes), and the process proceeds to Step S220.

Step S220: The controller 50 performs the enlargement process or the reduction process on the image G with respect to the prescribed reference point BP. More specifically, the controller 50 performs the enlargement process or the reduction process on the image G while using the reference point BP as a starting point. For example, as illustrated in FIG. 6C, the controller 50 performs the enlargement process on the image G while using the reference point BP, i.e., the upper left side of the display surface 22, as the starting point. In another example, as illustrated in FIG. 7C, the controller 50 performs the enlargement process on the image G while using the reference point BP, i.e., the upper right side of the display surface 22, as the starting point. The process thus ends.

As described above with reference to FIGS. 1 and 5 to 7C, the controller 50 recognizes the positional relationship between the first contact position P1 and the operation position MP defined by the second contact position P2 and the third contact position P3a and further identifies the prescribed reference point BP on the basis of the positional relationship. Accordingly, it is possible to prevent the situation where the fingers of the user performing the pinching operation overlap with the image the user wishes to enlarge (e.g., the image representing one of the letters "A" and "B"). As a result, it is possible to improve the operability.

Further, the display surface 22 includes the two regions divided by the boundary line BL extending through the first contact position P1. When having determined that the operation position MP is positioned in one of the two regions (the first region R1 and the second region the controller 50 identifies the prescribed reference point BP to be positioned in the other of the two regions. For example, when having determined that the operation position MP is positioned in the first region R1, the controller 50 identifies the prescribed reference point BP to be positioned in the second region R2. By contrast, when having determined that the operation position MP is positioned in the second region R2, the controller 50 identifies the prescribed reference point BP to be in the first region R1. Accordingly, when the pinching operation is performed, the image G is moved to the region on the side different from that of the position in which the pinching operation was performed. As a result, it is possible to prevent the situation where the fingers of the user performing the pinching operation overlap with the image the user wishes to enlarge or reduce (e.g., the image representing one of the letters "A" and "B"). As a result, it is possible to improve the operability.

When having determined that the operation position MP is positioned on the right-hand side of the first contact position P1, the controller 50 identifies the prescribed reference point BP to be on the upper left side of the display surface 22. When having determined that the operation position MP is positioned on the left-hand side of the first contact position P1, the controller 50 identifies the prescribed reference point BP to be on the upper right side of the display surface 22. Accordingly, it is possible to prevent the situation where the fingers of the user performing the pinching operation overlap with the image the user wishes to enlarge or reduce (e.g., the image representing one of the letters "A" and "B"). As a result, it is possible to improve the operability.

Figure 8:
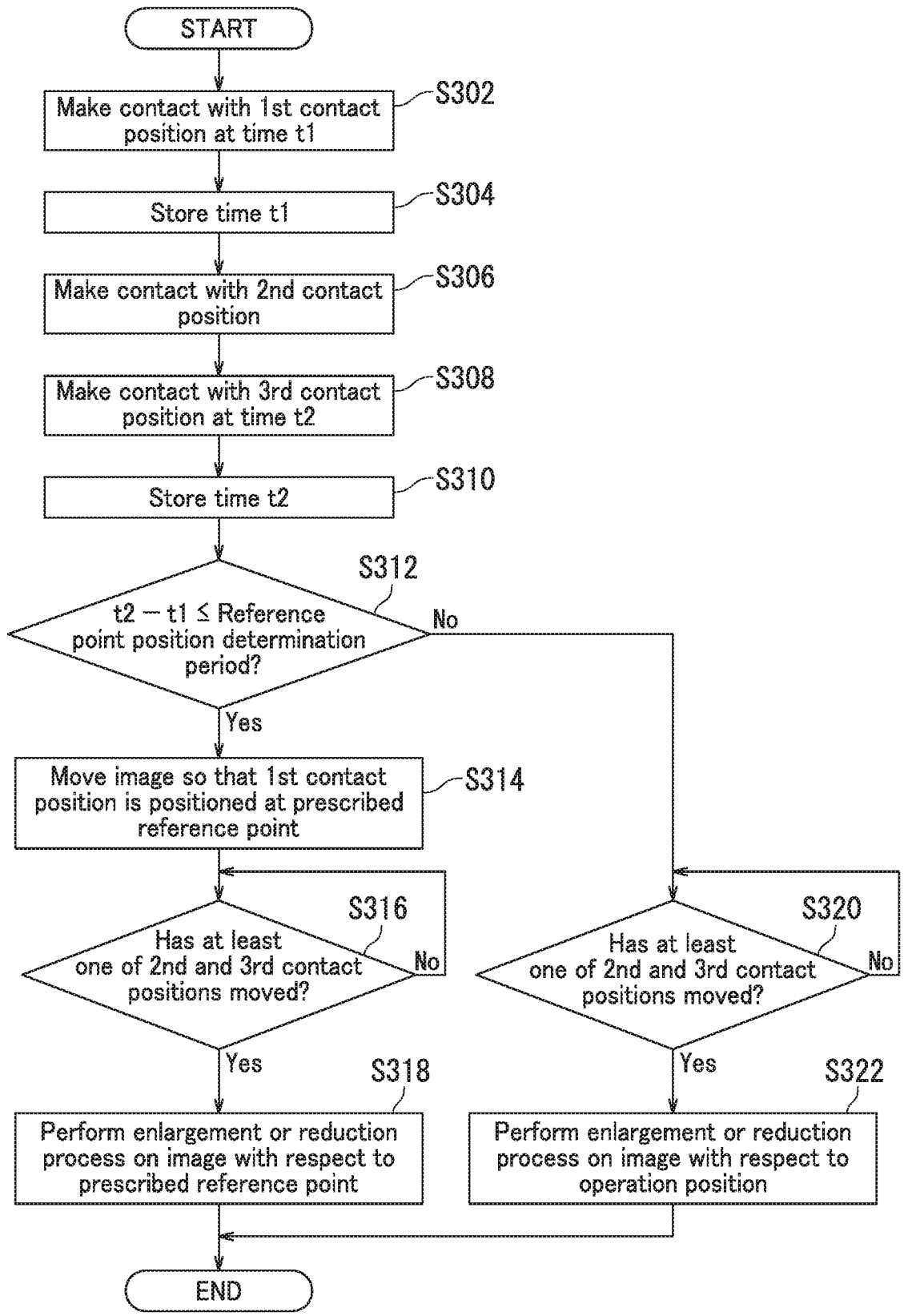
FIG. 8 is a flowchart depicting a method for setting an enlargement process or a reduction process implemented by the display device on an image according to the embodiment of the present invention.

Another arrangement is also acceptable in which it is possible to change the setting for the position of the starting point used for the enlargement process or the reduction process, in accordance with the timing with which a third contact position P3 is detected. Yet another method for performing an enlargement process or a reduction process implemented by the display device 10 on the image G according to the embodiment of the present invention will be described with reference to FIGS. 1, 6A to 6C, and 8. FIG. 8 is a flowchart depicting the method for setting the enlargement process or the reduction process implemented by the display device 10 on the image G according to the embodiment of the present invention. As a result of the processes performed at Steps S302 through S322 illustrated in FIG. 8, the enlargement process or the reduction process is performed on the image G. In the present embodiment, the enlargement process performed on the image G will be described. According to the method for performing the enlargement process or the reduction process on the image G depicted in the flowchart in FIG. 8, the setting for the position of the starting point used for the enlargement process or the reduction process is changed in accordance with the timing with which the third contact position P3 is detected. Description of some of the processes that are duplicate of those in the method for performing the enlargement process or the reduction process on the image G depicted in the flowchart in FIG. 3 will be omitted.

Step S302: The user makes contact with the first contact position P1 at a time t1. More specifically, as illustrated in FIG. 6A, the index finger of the left hand H1 of the user touches the first contact position P1. As a result of the first contact position P1 being touched, the detector 30 detects the first contact position P1. The process proceeds to Step S304.

Step S304: The controller 50 stores the time t1 into the storage 40. The process proceeds to Step S306.

Step S306: The user makes contact with the second contact position P2. More specifically, as illustrated in FIG. 6B, the thumb of the right hand H2 of the user touches the second contact position P2. As a result of the second contact position P2 being touched, the detector 30 detects the second contact position P2. The process proceeds to Step S308.

Step S308: The user makes contact with the third contact position P3a at a time t2. More specifically, as illustrated in FIG. 6B, the index finger of the right hand H2 of the user touches the third contact position P3a. As a result of the third contact position P3a being touched, the detector 30 detects the third contact position P3a. The process proceeds to Step S310.

Step S310: The controller 50 stores the time t2 into the storage 40. The process proceeds to Step S312.

Step S312: The controller 50 determines whether or not "time t2—time t1" (a first time period) is equal to or shorter than a reference point position determination period (a threshold value). The reference point position determination period is stored in the storage 40. The reference point position determination period is 5 seconds, for example. When the controller 50 determines that "time t2—time t1" is longer than the reference point position determination period (Step S312: No), the process proceeds to Step S320. When the controller 50 determines that "time t2—time t1" is equal to or shorter than the reference point position determination period (Step S312: Yes), the process proceeds to Step S314.

Step S314: The controller 50 moves the image G so that the first contact position P1 is positioned at the prescribed reference point BP. More specifically, as illustrated in FIG. 6B, when the detector 30 detects the first contact position P1 and subsequently detects the second contact position P2 and the third contact position P3a, the controller 50 moves the image G so that the first contact position P1 is positioned at the prescribed reference point BP. In the present embodiment, the prescribed reference point BP is positioned on the upper left side of the display surface 22. Accordingly, the image G moves to the upper left side. In other words, the image representing the letter "A" moves to the upper left side. The process proceeds to Step S316.

Step S316: The controller 50 determines whether or not at least one of the second contact position P2 and the third contact position P3a has moved. More specifically, the controller 50 determines whether or not at least one of the thumb of the right hand H2 of the user and the index finger of the right hand H2 of the user has moved. Even more specifically, the controller 50 determines whether or not the distance between the second contact position P2 and the third contact position P3a has changed. When the controller 50 determines that neither the second contact position P2 nor the third contact position P3a has moved (Step S316: No), when the controller 50 determines that the user has not performed a pinching operation, the process returns to Step S316. When the controller 50 determines that at least one of the second contact position P2 and the third contact position P3a has moved (Step S316: Yes), i.e., when the controller 50 determines that the user has performed a pinching operation, the process proceeds to Step S318. For example, as illustrated in FIG. 6C, when the index finger of the right hand H2 of the user has moved from the third contact position P3a to the third contact position P3b, the distance between the second contact position P2 and the third contact position P3b has changed from the distance d1 to the distance d2 Accordingly, the controller 50 determines that the user has performed the pinching operation (Step S316: Yes), and the process proceeds to Step S318.

Step S318: The controller 50 performs the enlargement process or the reduction process on the image G with respect to the prescribed reference point BP. More specifically, the controller 50 performs the enlargement process or the reduction process on the image G while using the reference point BP as a starting point. In the present embodiment, as illustrated in FIG. 6C, the controller 50 performs the enlargement process on the image G while using the reference point BP as the starting point. The process thus ends.

Step S320: The controller 50 determines whether or not at least one of the second contact position P2 and the third contact position P3a has moved. More specifically, the controller 50 determines whether or not at least one of the thumb of the right hand H2 of the user and the index finger of the right hand H2 of the user has moved. Even more specifically, the controller 50 determines whether or not the distance between the second contact position P2 and the third contact position P3a has changed. When the controller 50 determines that neither the second contact position P2 nor the third contact position P3a has moved (Step S320: No), i.e., when the controller 50 determines that the user has not performed a pinching operation, the process returns to Step S320. When the controller 50 determines that at least one of the second contact position P2 and the third contact position P3a has moved (Step S320: Yes), i.e., when the controller 50 determines that the user has performed a pinching operation, the process proceeds to Step S322. For example, as illustrated in FIG. 6C, when the index finger of the right hand H2 of the user has moved from the third contact position P3a to the third contact position P3b, the distance between the second contact position P2 and the third contact position P3b has changed from the distance d1 to the distance d2. Accordingly, the controller 50 determines that the user has performed the pinching operation (Step S320: Yes), and the process proceeds to Step S322.

Step S322: The controller 50 performs the enlargement or the reduction process on the image G with respect to the operation position MP. More specifically, the controller 50 performs the enlargement process or the reduction process on the image G while using the operation position MP as a starting point. In the present embodiment, the controller 50 performs the enlargement process on the image G while using the operation position MP as the starting point. The process thus ends.

As described with reference to FIGS. 1, 2A to 2C, and 8, in the display device 10, the controller 50 determines whether or not the first period (time t2—time t1), indicating the time period between the time t1 at which the first contact position P1 is detected and the time t2 at which the third contact position P3 is detected, is equal to or shorter than the threshold value (the reference point position determination period). Based on the determination result, the controller 50 moves the image G so that the first contact position P1 is positioned at the prescribed reference point BP.

More specifically, when the controller 50 determines that the first time period (time t2—time t1) is equal to or shorter than the threshold value (the reference point position determination period), the controller 50 moves the image G so that the first contact position P1 is positioned at the prescribed reference point BP. After that, the controller 50 performs the enlargement process or the reduction process on the image G with respect to the reference point BP. Accordingly, it is possible to prevent the situation where the fingers of the user performing the pinching operation overlap with the image the user wishes to enlarge or reduce (e.g., the image representing one of the letters "A" and "B"). As a result, it is possible to improve the operability.

By contrast, when the controller 50 determines that the first time period (second time t2—first time t1) is longer than the threshold value (the reference point position determination period), the controller 50 performs the enlargement process or the reduction process on the image G with respect to the operation position MP, without moving the image G. Accordingly, as a result of the user performing the pinching operation without designating a moving destination of the image G with a touch operation, it is possible to perform the enlargement process or the reduction process on the image G with respect to the position in which the pinching operation is performed, without moving the image G.

As described above, in accordance with the timing at which contact is made with the third contact position P3a, the display device 10 is able to change the setting of whether or not the image G is moved at the time of a pinching operation. Accordingly, in accordance with purposes, the user is able to change the setting for the position of the image G which the user wishes to enlarge or reduce.

In the display device 10 described with reference to FIGS. 1 to 8, when the detector 30 detects the first contact position P1 and subsequently detects the second contact position P2 and the third contact position P3, the controller 50 moves the image G so that the first contact position P1 is positioned at the prescribed reference point BP. However, another arrangement is also acceptable in which, when determining that a pinching operation has been performed, the controller 50 moves the image G so that the first contact position P1 is positioned at the prescribed reference point BP.

Figure 9:
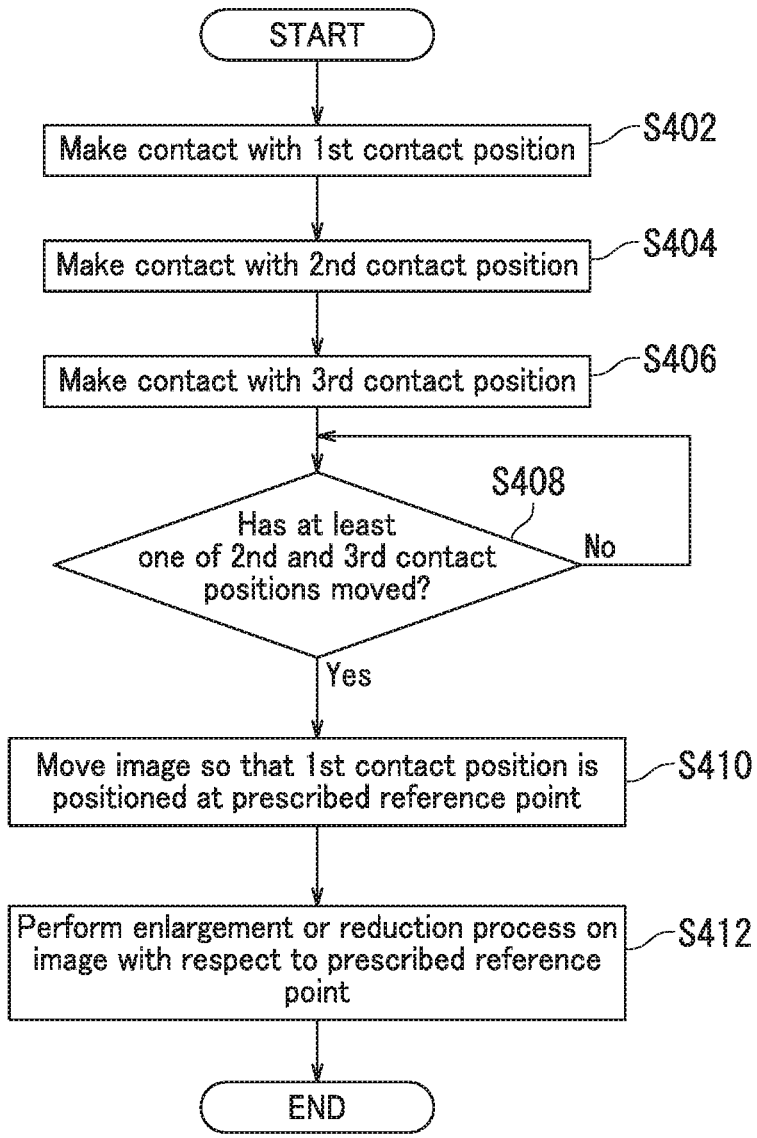
FIG. 9 is a flowchart depicting a method for setting an enlargement process or a reduction process implemented by the display device on an image according to the embodiment of the present invention.

Yet another method for performing an enlargement process or a reduction process implemented by the display device 10 on the image G according to the embodiment of the present invention will be described with reference to FIGS. 1 to 9. FIG. 9 is a flowchart depicting the method for setting the enlargement process or the reduction process implemented by the display device 10 on the image G according to the embodiment of the present invention. As a result of the processes performed at Steps S402 through S412 depicted in FIG. 9, the enlargement process or the reduction process is performed on the image G. In the method for performing the enlargement process or the reduction process on the image G depicted in the flowchart in FIG. 9, the processes are the same as those in the method for performing the enlargement process or the reduction process on the image G depicted in the flowchart in FIG. 3, except that the timing at which the controller 50 moves the image G is different. Accordingly, description of the duplicate part will be omitted.

Steps S402 through S406: The user makes contact with the first contact position P1, the second contact position P2, and the third contact position P3a. When the processes at Steps S402 through S406 have been performed, the process proceeds to Step S408.

Step S408: The controller 50 determines whether or not at least one of the second contact position P2 and the third contact position P3a has moved. More specifically, the controller 50 determines whether at least one of the thumb of the right hand H2 of the user and the index finger of the right hand H2 of the user has moved. Even more specifically, the controller 50 determines whether or not the distance between the second contact position P2 and the third contact position P3a has changed. When the controller 50 determines that neither the second contact position P2 nor the third contact position P3a has moved (Step S408: No), i.e., when the controller 50 determines that the user has not performed a pinching operation, the process returns to Step S408. When the controller 50 determines that at least one of the second contact position P2 and the third contact position P3a has moved (Step S408: Yes), i.e., when the controller 50 determines that the user has performed a pinching operation, the process proceeds to Step S410.

Step S410: The controller 50 moves the image G so that the first contact position P1 is positioned at the prescribed reference point BP. More specifically, when determining that the pinching operation has been performed, the controller 50 moves the image G so that the first contact position P1 is positioned at the prescribed reference point BP. The process proceeds to Step S412.

Step S412: The controller 50 performs the enlargement process or the reduction process on the image G with respect to the prescribed reference point BP. More specifically, the controller 50 performs the enlargement process or the reduction process on the image G while using the reference point BP as a starting point. In the present embodiment, the controller 50 performs the enlargement process on the image G while using the reference point BP as the starting point. The process thus ends.

As described above with reference to FIGS. 1 and 9, when determining that a pinching operation has been performed, the controller 50 moves the image G so that the first contact position P1 is positioned at the prescribed reference point BP. Accordingly, it is possible to prevent the situation where the fingers of the user performing the pinching operation overlap with the image the user wishes to enlarge (e.g., the image representing the letter "A"). As a result, it is possible to improve the operability.

Figure 10:
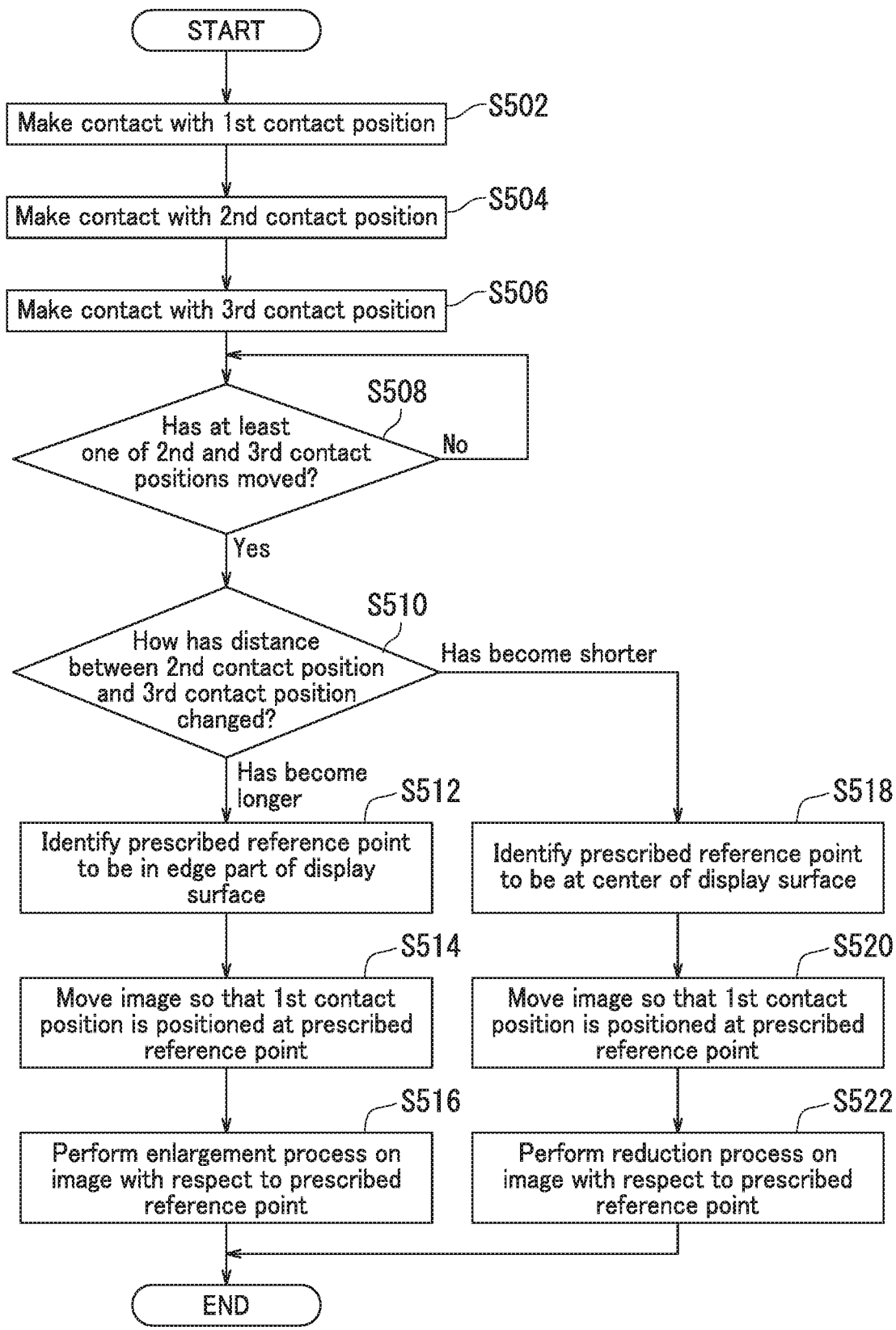
FIG. 10 is a flowchart depicting a method for setting an enlargement process or a reduction process implemented by the display device on an image according to the embodiment of the present invention.

Another arrangement is also acceptable in which it is possible to change the setting for the position of the starting point used for the enlargement process or the reduction process in accordance with whether a pinch-in operation has been performed or a pinch-out operation has been performed. Yet another method for performing an enlargement process or a reduction process implemented by the display device 10 on the image G according to the embodiment of the present invention will be described with reference to FIGS. 1, 2A to 2C, 4A to 4C, and 10. FIG. 10 is a flowchart depicting the method for setting the enlargement process or the reduction process implemented by the display device 10 on the image G according to the embodiment of the present invention. As a result of the processes performed at Steps S502 through S522 depicted in FIG. 10, the enlargement process or the reduction process is performed on the image G. Description of some of the processes that are duplicate of those in the method for performing the enlargement process or the reduction process on the image G depicted in the flowchart in FIG. 3 will be omitted.

Step S502: The user makes contact with the first contact position P1. More specifically, as illustrated in FIGS. 2A and 4A, the index finger of the left hand H1 of the user touches the first contact position P1. As a result of the first contact position P1 being touched, the detector 30 detects the first contact position P1. The process proceeds to Step S504.

Step S504: The user makes contact with the second contact position P2. More specifically, as illustrated in FIGS. 2B and 4B, the thumb of the right hand H2 of the user touches the second contact position P2. As a result of the second contact position P2 being touched, the detector 30 detects the second contact position P2. The process proceeds to Step S506.

Step S506: The user makes contact with the third contact position P3a. More specifically, as illustrated in FIGS. 2B and 4B, the index finger of the right hand H2 of the user touches the third contact position P3a. As a result of the third contact position P3a being touched, the detector 30 detects the third contact position P3a. The process proceeds to Step S508.

Step S508: The controller 50 determines whether or not at least one of the second contact position P2 and the third contact position P3a has moved. More specifically, the controller 50 determines whether or not at least one of the thumb of the right hand H2 of the user and the index finger of the right hand H2 of the user has moved. Even more specifically, the controller 50 determines whether or not the distance between the second contact position P2 and the third contact position P3a has changed. When the controller 50 determines that neither the second contact position P2 nor the third contact position P3a has moved (Step S508: No), i.e., when the controller 50 determines that the user has not performed a pinching operation, the process returns to Step S508. When the controller 50 determines that at least one of the second contact position P2 and the third contact position P3a has moved (Step S508: Yes), i.e., when the controller 50 determines that the user has performed a pinching operation, the process proceeds to Step S510.

Step S510: The controller 50 determines how the distance between the second contact position P2 and the third contact position P3a has changed. More specifically, the controller 50 determines whether the distance between the second contact position P2 and the third contact position P3a has become longer or shorter than the distance d1 between the second contact position P2 and the third contact position P3a that was observed when the detector 30 detected the third contact position P3a at Step S506. When the controller 50 determines that the distance has become shorter than the distance d1 (Step S510: Has become shorter), i.e., when the controller 50 determines that a pinch-in operation has been performed, the process proceeds to Step S518. When the controller 50 determines that the distance has become longer than the distance d1 (Step S510: Has become longer), i.e., when the controller 50 determines that a pinch-out operation has been performed, the process proceeds to Step S512.

Step S512: The controller 50 identifies the prescribed reference point BP to be in an edge part of the display surface 22. For example, the controller 50 identifies the prescribed reference point BP to be on the upper left side of the display surface 22. The process proceeds to Step S514.

Step S514: The controller 50 moves the image G so that the first contact position P1 is positioned at the prescribed reference point BP. More specifically, as illustrated in FIG. 2B, when the detector 30 detects the first contact position P1 and subsequently detects the second contact position P2 and the third contact position P3a, the controller 50 moves the image G so that the first contact position P1 is positioned at the prescribed reference point BP. In the present embodiment, the prescribed reference point BP is positioned on the upper left side of the display surface 22. Accordingly, the image G moves to the upper left side. In other words, the image representing the letter "A" moves to the upper left side. The process proceeds to Step S516.

Step S516: The controller 50 performs the enlargement process on the image G with respect to the prescribed reference point BP. More specifically, as illustrated in FIG. 2C, the controller 50 performs the enlargement process on the image G while using the reference point BP as a starting point. The process thus ends.

Step S518: The controller 50 identifies the prescribed reference point BP to be at the center of the display surface 22. The process proceeds to Step S520.

Step S520: The controller 50 moves the image G so that the first contact position P1 is positioned at the prescribed reference point BP. More specifically, as illustrated in FIG. 4B, when the detector 30 detects the first contact position P1 and subsequently detects the second contact position P2 and the third contact position P3a, the controller 50 moves the image G so that the first contact position P1 is positioned at the prescribed reference point BP. In the present embodiment, the prescribed reference point BP is positioned at the center of the center of the display surface 22. Accordingly the image representing the letter "A" moves to the center. The process proceeds to Step S522.

Step S522: The controller 50 performs the reduction process on the image G with respect to the prescribed reference point BP. More specifically, as illustrated in FIG. 4C, the controller 50 performs the reduction process on the image G while using the reference point BP as a starting point. The process thus ends.

As described above with reference to FIGS. 1, 2A to 2C, 4A to 4C, and 10, when the controller 50 determines that a pinch-out operation has been performed, the controller 50 identifies the prescribed reference point BP to be in an edge part of the display surface 22. Further, when the controller 50 determines that a pinch-in operation has been performed, the controller 50 identifies the prescribed reference point BP to be at the center of the display surface 22. Accordingly, at the time of a pinching operation, the image G moves to a position that is easier to see in accordance with the type of the pinching operation. Consequently, it is possible to prevent the situation where the fingers of the user performing the pinching operation overlap with the image the user wishes to enlarge (e.g., the image representing the letter "A"). As a result, it is possible to improve the operability.

An embodiment of the present invention is described so far with reference to the drawings (FIGS. 1 to 10). The present invention, however, is not limited, to the embodiment described above. It is possible to implement the present invention in various modes (e.g., (1) and (2) described below) without departing from the gist thereof. To enhance legibility, the drawings are schematically illustrated while a focus is placed on the constituent elements thereof. The lengths, the quantity, and the like of the constituent elements illustrated in the drawings may be different from those in actuality for the sake of convenience in the preparation of the drawings. Further, the shapes, the dimensions, and the like of the constituent elements described in the above embodiment are merely examples, and are not particularly limited. It is possible to apply different variations thereto, without substantially departing from the effects of the present invention.

(1) As described with reference to FIGS. 6A to 6C and 7A to 7C, the display surface 22 of the display device 10 is divided by the boundary line BL into the two regions positioned on the left and the right; however, the present invention is not limited to this example. For instance, the display surface 22 may be divided by the boundary line BL into two regions positioned at the top and the bottom.

(2) As described with reference to FIGS. 1 to 10, the display device 10 is a smartphone or a tablet computer; however, the present invention is not limited to this example. For instance, the display device 10 may be provided in an image forming apparatus.

The invention claimed is:
1. A display device comprising:
a display section having a display surface and being configured to display an image;
a detector capable of detecting a plurality of contact positions based on contact made on the display surface by a detected object; and
a controller configured to control the display section and the detector, wherein
the plurality of contact positions include a first contact position, a second contact position, and a third contact position,
when the detector detects the first contact position and subsequently detects the second contact position and the third contact position, the controller moves the image so that the first contact position is positioned at a prescribed reference point, and when the controller determines that a pinching operation has been performed based on a change in a distance between the second contact position and the third contact position, the controller performs an enlargement process or a reduction process on the image with respect to the prescribed reference point,
the controller recognizes a positional relationship between the first contact position and an operation position defined by the second contact position and the third contact position and identifies the prescribed reference point based on the positional relationship,
this display surface is divided into two regions using a boundary line extending across the entire display through the first contact position to identify a left-hand side and a right-hand side region or a top and a bottom region with respect to the contact position, and
when determining that the operation position is positioned in one of the two regions, the controller identifies the prescribed reference point to be in the other of the two regions.
2. The display device according to claim 1, wherein the prescribed reference point is positioned in an edge part of the display surface.
3. The display device according to claim 2, wherein the prescribed reference point is positioned in a corner part of the display surface.
4. The display device according to claim 3, wherein the prescribed reference point is positioned on an upper left side of the display surface.

5. The display device according to claim 1, wherein
when determining that the operation position is positioned on a right-hand side of the first contact position, the controller identifies the prescribed reference point to be positioned on an upper left side of the display surface, and
when determining that the operation position is positioned on a left-hand side of the first contact position, the controller identifies the prescribed reference point to be positioned on an upper right side of the display surface.

6. The display device according to claim 1, wherein
the operation position is a middle point between the second contact position and the third contact position.

7. The display device according to claim 1, wherein
the operation position is one of the second contact position and the third contact position.

8. The display device according to claim 1, wherein
the prescribed reference point is positioned at a center of the display surface.

9. The display device according to claim 1, wherein
at a time when the detector detects the first contact position and subsequently detects the second contact position and the third contact position, the controller moves the image so that the first contact position is positioned at the prescribed reference point.

10. The display device according to claim 1, wherein
when determining that the pinching operation has been performed, the controller moves the image so that the first contact position is positioned at the prescribed reference point.

11. The display device according to claim 1, wherein
the controller determines whether a first time period indicating a time period between a time at which the first contact position is detected and a time at which the third contact position is detected is equal to or shorter than a threshold value, and
based on a result of the determination, the controller moves the image so that the first contact position is positioned at the prescribed reference point.

12. The display device according to claim 1, wherein
when the distance between the second contact position and the third contact position has become longer, the controller determines that a pinch-out operation has been performed, whereas when the distance between the second contact position and the third contact position has become shorter, the controller determines that a pinch-in operation has been performed, and
when determining that the pinch-out operation has been performed, the controller identifies the prescribed reference point to be positioned in an edge part of the display surface, whereas when determining that the pinch-in operation has been performed, the controller identifies the prescribed reference point to be positioned at a center of the display surface.

13. A display device comprising:
a display section having a display surface and being configured to display an image;
a detector capable of detecting a plurality of contact positions based on contact made on the display surface by a detected object; and
a controller configured to control the display section and the detector, wherein
the plurality of contact positions include a first contact position, a second contact position, and a third contact position,
when the detector detects the first contact position and subsequently detects the second contact position and the third contact position, the controller moves the image so that the first contact position is positioned at a prescribed reference point, and when the controller determines that a pinching operation has been performed based on a change in a distance between the second contact position and the third contact position, the controller performs an enlargement process or a reduction process on the image with respect to the prescribed reference point,
when the distance between the second contact position and the third contact position has become longer, the controller determines that a pinch-out operation has been performed, whereas when the distance between the second contact position and the third contact position has become shorter, the controller determines that a pinch-in operation has been performed, and
when determining that the pinch-out operation has been performed, the controller identifies the prescribed reference point to be positioned in an edge part of the display surface, whereas when determining that the pinch-in operation has been performed, the controller identifies the prescribed reference point to be positioned at a center of the display surface.

* * * * *